United States Patent [19]

Baker, Jr.

[11] 4,280,620
[45] Jul. 28, 1981

[54] LATERALLY FLEXIBLE CONVEYOR BELT
[75] Inventor: Charles F. Baker, Jr., Akron, Ohio
[73] Assignee: The B. F. Goodrich Company, Akron, Ohio
[21] Appl. No.: 20,697
[22] Filed: Mar. 15, 1979
[51] Int. Cl.³ .............................................. B65G 15/08
[52] U.S. Cl. ..................................... 198/825; 198/847
[58] Field of Search ........ 198/847, 844, 846, 823–830, 198/818, 821

[56] References Cited
U.S. PATENT DOCUMENTS

| 707,355 | 8/1902 | Ridgway | 198/847 |
| 999,419 | 8/1911 | Van Wert | 198/823 X |
| 3,545,598 | 12/1970 | McGinnis | 198/847 X |
| 3,615,152 | 10/1971 | Bouzat | 198/847 |
| 3,630,340 | 12/1971 | Bouzat | 198/818 X |

FOREIGN PATENT DOCUMENTS 12382  12/1956  Fed. Rep. of Germany ........... 198/847

Primary Examiner—Bruce H. Stoner, Jr.
Assistant Examiner—Douglas D. Watts
Attorney, Agent, or Firm—Michael J. Colitz, Jr.

[57] ABSTRACT

A conveyor belt supportable on troughing rollers for conveying bulk material. The belt is capable of sharp lateral curves and includes a main body section with an embedded, central, inextensible, flexible spine formed of cables. Corrugations extend outwardly to the edges from the central section of the body. The central section of the body is rectangular in cross section and constitutes the majority of the belt. The belt is molded flat and has layers of cords or strands, of inextensible material such as wire, embedded therein from edge to edge. The layers are parallel to each other and to the surfaces of the belt adjacent the edges and adjacent the central portion of the body. Along the lines where the corrugations meet the central portion, the layers are positioned closer to each other to thereby define hinges for bending of the belt longitudinally to thereby permit troughing of the belt during the conveying of bulk material.

5 Claims, 7 Drawing Figures

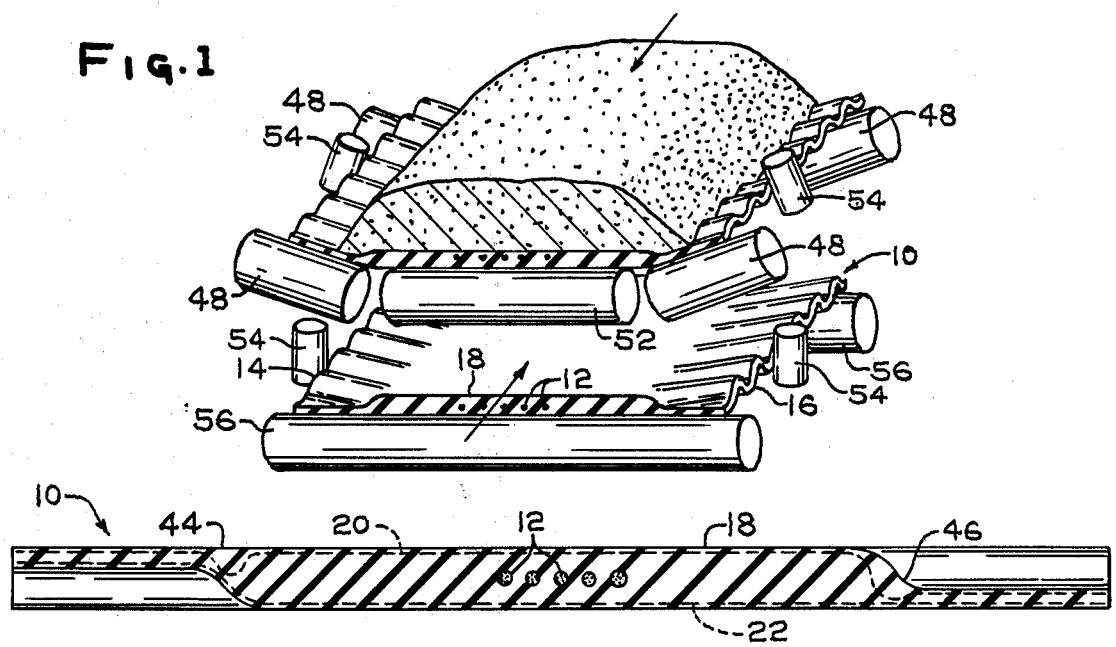
Fig. 1
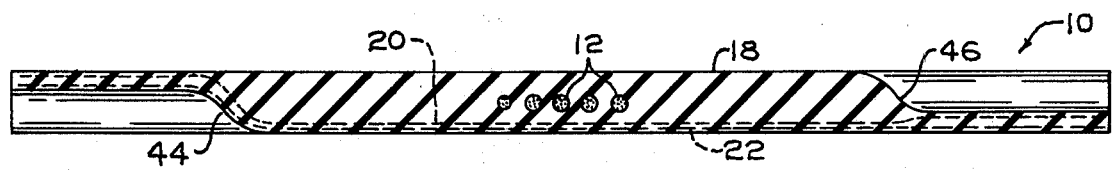
Fig. 2a
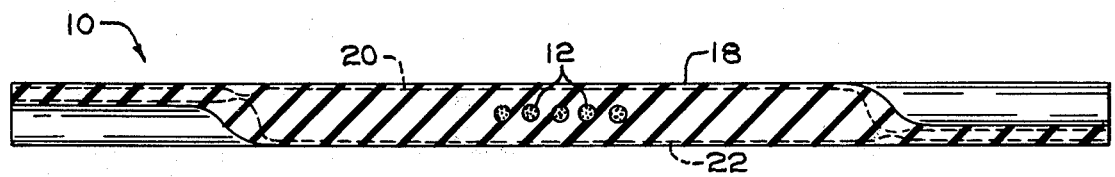
Fig. 2b
Fig. 2c
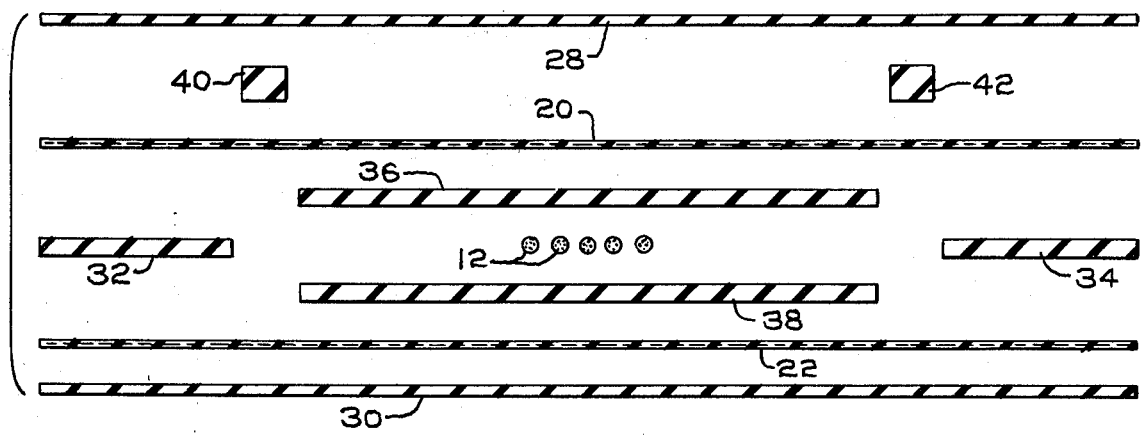
Fig. 3

LATERALLY FLEXIBLE CONVEYOR BELT

BACKGROUND OF THE INVENTION

Heretofore conveyor belts have been operated in generally straight paths without the ability to make transverse curves. In those few instances in which curved paths are followed, the curves have been very gradual so that pronounced differences in direction have required a curve extending over a great distance.

One prior art approach for permitting a belt to move in sharp transverse curves is described in U.S. Pat. No. 3,545,598. According to that disclosure, large corrugated edges are provided on each side of a relatively narrow central body portion. The entire conveyor belt is molded in a troughed configuration, with its edges bent up through the corrugations. In such an embodiment, the corrugations remain in a troughed configuration during the conveying of bulk material as well as during the return run of the belt. This requires a large height in which to operate a conveying system using such belt. Such a configuration achieves its objective of conveying bulk material around corners but suffers from deficiencies of relatively high vertical extent in which to operate, relatively high cost of fabrication and requiring relatively high operating power.

Flat molded conveyor belts troughable during the conveying of bulk material are disclosed in U.S. Pat. No. 3,679,044. In such configuration, however, no allowance is made for movement around sharp transverse curves.

SUMMARY OF THE INVENTION

According to the present invention, a conveyor belt is constructed with a central, inextensible, flexible spine which may be a cable or cluster of cables. The cables are embedded in elastomer such as rubber material of a suitable grade for toughness, flexibility, fire resistance, etc. The central portion of the belt constitutes the major cross sectional extent of the belt and is substantially rectangular in cross section. Molded integrally therewith in a flat configuration on opposite sides of the main central portion are corrugated sections extending outwardly to the edges. The entire belt is molded in a flat orientation and includes layers of strands, preferably of inextensible, flexible wires, the wires of each layer being parallel to each other and with the layers being generally parallel to the faces of the belt. The layers are parallel to each other except along lines corresponding to the intersection of the main flat portion of the belt and its corrugated edges. Along these lines, the layers of wire are closer together to constitute hinge lines about which the corrugated portions may bend upwardly when bulk material is being conveyed.

It has been found that the present flat molded belt which is troughable offers many advantages. For example, the flat central portion extending from hinge to hinge results in less carryover of particulate bulk material after reaching the end of the conveyor run as the belt reverses direction and inverts to move in a return path. Molding of the belt flat also permits the use of smaller diameter terminal pulley than in prior applications because the corrugations are not stretched when going around such pulleys. This in turn permits operation in lower height applications for increased compactness of the system. The flatness of the conveyor belt on the return path also reduces the minimum height in which the conveyor may operate. And since the driven pulleys are primarily in contact with a continuous flat central portion of the belt, more driving contact and force is imparted to the belt. Reduced operating power is considered to be needed for driving troughable, flat molded conveyor belts with edge corrugations, than for prior art corrugated belts molded in the troughed configuration. And, lastly, flat molded belts permit reduced cost of fabrication, packing, shipping, installation, repair, splicing, etc. over belts molded in the troughed condition.

BRIEF DESCRIPTION OF THE DRAWINGS

In the accompanying drawings,

FIG. 1 is a perspective view of a short section of the load carrying conveyor belt constructed in accordance with the instant invention, showing how it is supported on the troughing rollers along with a corresponding view of a section of the return run showing how it is supported on untroughed cylindrical idler rolls. Portions of the belt have been removed to show internal constructions thereof and material being conveyed is illustrated.

FIGS. 2A, 2B, and 2C are embodiments of the cross section of the conveyor belt taken along line 2—2 of FIG. 4.

FIG. 3 is an exploded sectional view of the conveyor belt showing internal portions thereof prior to molding.

DETAILED DESCRIPTION

The belt 10 of the present invention has a main body portion which is thin and wide and constructed of rubber or other suitable elastomer. The elastomer may be vulcanized rubber or of other elastomer suitably blended for toughness, flexibility, fire resistance, and other properties to meet special requirements. Embedded within the main body portion are longitudinally oriented splines in the form of cables 12 which are lengthwise inextensible but flexible for movement around conveyor rolls for continuous movement along a path of travel. Five of such cables are shown in the preferred embodiment of the invention although more or less could be utilized adjacent the central longitudinal extent of the conveyor belt depending on the application of the conveyor belt and system.

Figure 4:
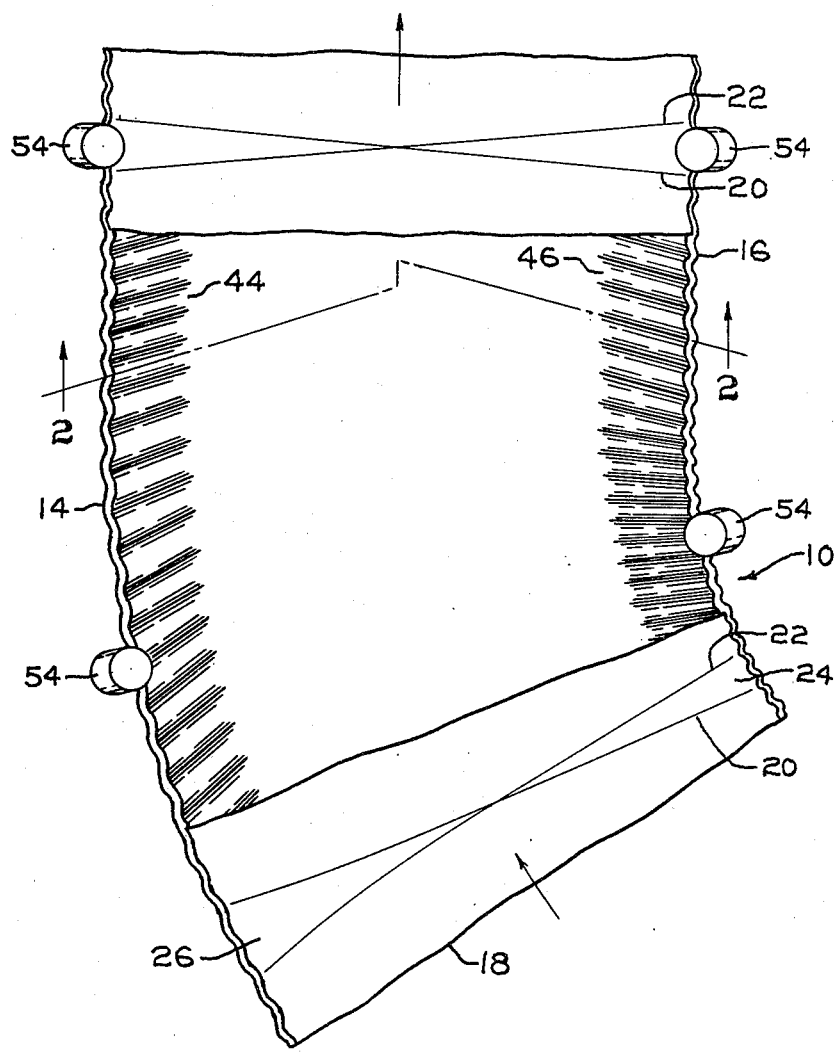
FIG. 4 is a plan view of the same belt but with parts removed to show internal construction, particularly of the support wire in both the straight and curved paths of motion.

The corrugations 14,16 adjacent the edges of the belt are for the purpose of longitudinal extensibility and contractability of the opposite belt edges during movement around sharp curves as shown in FIG. 4. The corrugations accordingly are formed adjacent the central rectangular portion 18 of the belt body. They extend without interruption from their junction with the central rectangular portion to the edges of the belt. In addition, the corrugations are deep enough to permit the necessary local changes in length of the edges through expansion and contraction as the belt passes around sharp lateral curves as well as around direction-reversing rollers at the ends of the path of movement. The corrugations are preferably angled rearwardly from a line transverse from the direction of belt motion by about 20°. The angle of the corrugations minimizes vibration of the belt as it moves across the idler rollers.

Figure 5:
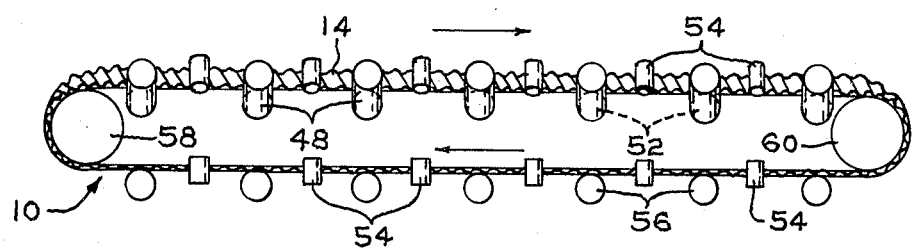
FIG. 5 is a schematic side elevational view of the belt on support rollers showing its path of movement during operation.

A plurality, preferably two, of strength imparting layers 20,22 of strands or cords such as parallel wires are embedded within the main body of the belt and are separated from each other and from the cables by the various layers of the rubber. The wires of each layer are inextensible but capable of pantographic deformation in both the transverse or edge to edge direction as well as in the longitudinal direction of belt movement. The wires extend from edge to edge of the belt and, like the cables, provide support along the entire longitudinal extent of the belt as shown in FIG. 5.

Along the main portion of the belt, the wires of each layer are positioned about 7½° in either direction from a line transverse to the direction of belt movement. This positioning of the wires will minimize or eliminate the propagation of belt tears along the corrugations since the corrugations are formed at much higher angles. Such tears, without the use of wires, would normally start at the edge of the belt and progress toward the central portion of the belt along a corrugation.

During turning of the belt around transverse curves, as when the belt conveys material around corners, the angles of the crossing wires of the layers will be compressed with the internal edges of the corners becoming more like a thin wedge in shape as at 24. The external edges of the wires, during such cornering will permit expansion of those portions into more like a larger wedge in shape as at 26. The wires of one layer 20 bow in one direction. The wires of the other layer 22 bow in the opposite direction. During straight movement of the belt, the wires of both layers are straight. FIG. 4 illustrates these wire movements by showing but two wires of each layer for purposes of illustration only.

FIG. 3 illustrates an orientation of the rubber layers which may be utilized to build up the flat molded belt. The sections include upper and lower main layers 28,30 and a central area constructed of various slabs of rubber. The central slabs include small edge portions 32,34 and central slabs 36,38 in which the cables are to be embedded. Wire layers 20 and 22 are placed above and below the central slabs 36,38 except for filler slabs 40,42 located above the upper layers so that during the molding operation the upper layers will be bent downwardly to create hinge lines 44,46 about which the corrugated edges may conveniently flex.

The bringing together of the wire layers along the hinge lines adds flexibility to the belt at these lines. The layers can be as close as possible and even touch. The separated wires at other areas adds beam strength where needed, particularly in the corrugations. Such strength is to be avoided at the hinges.

An alternate construction is shown in FIG. 2B with 2A constituting the preferred embodiment. In FIG. 2B, the layers in the corrugated edges are widely separated as in FIG. 2A. The layers are parallel to each other and parallel to the surfaces of the belt. In the alternate embodiment, the layers are located close together adjacent the hinge lines but remain in that close orientation across the main central extent of the belt instead of reseparating as in the preferred embodiment. This orientation is achieved by constructing the filler slabs 40 and 42 as extensions of central slabs 36 and 38 and then running the upper layer of wires above end slabs 32 and 34 but beneath both central slabs 36 and 38.

A second alternate embodiment is shown in FIG. 2C. In that embodiment, filler slabs 40 and 42 are horizontally split to create four equally sized filler slabs rather than two as shown in FIG. 3. The upper half-filler slabs are retained above both wire layers while the lower-half filler slabs are retained beneath both wire layers. The molded belt of this embodiment is symmetric in that it can be mounted on the rollers with either face up.

The entire assembly is preferably subjected to heat and pressure in a platen press or other suitable equipment to consolidate and bond together all of the various elements of the belt body structure. Vulcanization takes place at that time. The entire belt assembly will have a substantially uniform cross section along the width of the cental body portion which constitutes the majority of the extent of the conveyor belt. The corrugated edges, which constitute the minority extent of the conveyor belt when viewed across a transverse section, are slightly thinner. The flat molding of the belt permits reduced costs of fabrication over belts molded in the troughed orientation.

Suitable edge rollers 54 are employed to hold down the corrugated edges of the belt during running in the troughed condition and keep the entire belt in proper position. In operation, troughing idler rollers 48 and idler rollers 52 will be utilized along the top extent. The edge rollers 54 assisted by the weight of the belt will force the main body portion of the belt downwardly into contact with the supporting base idler rollers 52. The corrugated edges will assume shapes extending upwardly against the lateral edge rollers 54 in the troughed condition as the belt bends about the pivot hinge lines formed by the wires adjacent the lines where the corrugated edges meet the central body portion. Edge rollers 54 are also utilized on the return run to maintain the belt in proper position, particularly during cornering.

The corrugated edges of the belt will be held in their normal non-compressed, non-expanded orientation during straight runs. They will, however, deform when moving around transverse corners where compression of internal edges and corresponding expansion of the outward edges takes place during such transverse curvature. Straight idler rollers 56 guide the belt on the return path. When no material is being conveyed as when the belt is moved around terminal pulleys 58,60 during loading or unloading areas or along the return run, the belt will assume its natural untroughed orientation in which it has been molded. One or more of the terminal pulleys is power driven to provide the system with motive force.

The purpose of the wire layers is to add strength and support to the belt. The strength and support are in the nature of transverse stiffness and lateral support which are particularly needed on and adjacent the inside corrugations while the belt is turning a corner. As can be understood more readily by viewing FIG. 4, a curving belt tends to move in a straight line. While cornering, the central portion of the belt thus tends to push the inner half of the belt, particularly the corrugations against the adjacent inside troughing idler rollers 48 and edge rollers 54. Without the added strength and support, the belt would buckle and bend at the corrugations creating an unacceptable condition.

The wires along the hinge lines, being positioned close together, does not add the rigidity to the belt as they do at the corrugations where the wire layers are spaced. This permits the desired flexing of the belt along the hinge lines as desired.

The instant invention has been described as being carried out in particular embodiments. It is not intended to be so limited but it is intended to be covered broadly within the spirit and scope of the appended claims.

I claim:

1. A conveyor belt for carrying bulk material in a path of travel having both straight and transversely curved portions including:
   a central portion and corrugated edge portions extending from the central portion and defining parallel hinge lines adjacent the longitudinal lines where the corrugated edge portions meet the central portion, said central portion and corrugated edge portions being molded untroughed from an elastomeric composition with said central portion being of a rectangular cross sectional configuration,
   a plurality of flexible, inextensible reinforcing cables encompassed within the belt adjacent the longitudinal center of the belt and extending in a closed loop configuration along the entire length of the belt to minimize longitudinal stretching of the belt, and
   a plurality of flexible, inextensible cord layers encompassed within the belt, said layers being spaced from each other and parallel with the surfaces of the belt except adjacent lines parallel with the hinge lines whereat at least one of said cord layers is oriented to be closer to the other of said cord layers whereat the corrugated edges may be bent upwardly to define a troughed configuration.

2. The conveyor belt as set forth in claim 1 wherein said cord layers are wires constructed with the wires of each layer extending at about $7\frac{1}{2}°$ in either direction from a line transverse to the direction of movement of the belt and the corrugations extend rearwardly from direction of belt movement at about 20° from a line transverse from the direction of belt movement.

3. The conveyor belt as set forth in claim 1 and further including idler and edge rollers for supporting and guiding the belt along the material conveying and return paths.

4. The belt as set forth in claim 1 wherein one of said cord layers is a constant distance from its adjacent belt surface from edge to edge.

5. In a conveyor belt for carrying bulk material in a path including both straight and transversely curved positions, said conveyor belt being constructed of elastomeric material including a central portion of a rectangular cross sectional configuration and corrugated edge portions extending outwardly from said central portion and further including, embedded in said elastomeric material, longitudinally inextensible reinforcing cables and layers of reinforcing cords extending from edge to edge, the improvement including said belt being molded in and untroughed orientation with longitudinal hinge lines adjacent the lines where the corrugated edge portions meet the central portion, said hinge lines being formed by the layers being spaced from and parallel to each other and to the surfaces of the belt at all points except along the hinge lines where they are positioned closer together than at all other areas.

* * * * *